(12) United States Patent
Seon

(10) Patent No.: US 6,193,264 B1
(45) Date of Patent: Feb. 27, 2001

(54) COLLAPSIBLE GOLF TROLLEY

(76) Inventor: Park Do Seon, 102-504, Hana A.P.T. No. 362, Galsan 2-Dong Fu-Pyung Gu, Inchon (KR)

( * ) Notice: Subject to any disclaimer, the term of this patent is extended or adjusted under 35 U.S.C. 154(b) by 0 days.

(21) Appl. No.: 09/389,262

(22) Filed: Sep. 3, 1999

(51) Int. Cl.⁷ ............................................ B62B 1/04
(52) U.S. Cl. ............... 280/652; 280/655; 280/47.17; 280/47.315
(58) Field of Search ...................... 280/652, DIG. 5, 280/DIG. 6, 47.26, 655, 655.1, 38, 42, 645, 648, 47.17, 47.315; 224/274; 248/96; D34/15

(56) References Cited

U.S. PATENT DOCUMENTS

| | | | | |
|---|---|---|---|---|
| 4,289,326 | * | 9/1981 | Hawkes | 280/646 |
| 4,340,236 | * | 7/1982 | Seibold et al. | 280/38 |
| 5,106,117 | * | 4/1992 | Wang | 280/646 |
| 5,201,540 | * | 4/1993 | Wu | 280/646 |
| 5,421,604 | * | 6/1995 | Wu | 280/655 |
| 5,427,403 | * | 6/1995 | Hsiao | 280/646 |
| 5,451,072 | * | 9/1995 | Weng | 280/646 |
| 5,454,576 | * | 10/1995 | Pikanen | 280/42 |
| 5,581,847 | * | 12/1996 | Hsieh | 16/115 |
| 6,050,592 | * | 4/2000 | Kim | 280/652 |
| 6,079,718 | * | 6/2000 | Liao | 280/47.26 |
| 6,126,182 | * | 10/2000 | Wu | 280/47.26 |

* cited by examiner

Primary Examiner—J. J. Swann
Assistant Examiner—J. Allen Shriver
(74) Attorney, Agent, or Firm—Alan Kamrath; Bridge Bennett Egan & Arundel, LLP.

(57) ABSTRACT

A collapsible golf trolley has a collapsible frame device and a bag disposed on the collapsible frame device. The collapsible frame device has an outer pipe, an inner pipe inserted in the outer pipe, a lower joint disposed on a middle portion of the outer pipe, two support frames connected to the lower joint, each support frame connected to a wheel connector, the wheel connector connected to a wheel, and two pull rods. Each pull rod is connected to a slide block of the outer pipe and the respective support frame. A rope is connected to the support frames. A releasing device is disposed on the outer pipe.

6 Claims, 20 Drawing Sheets

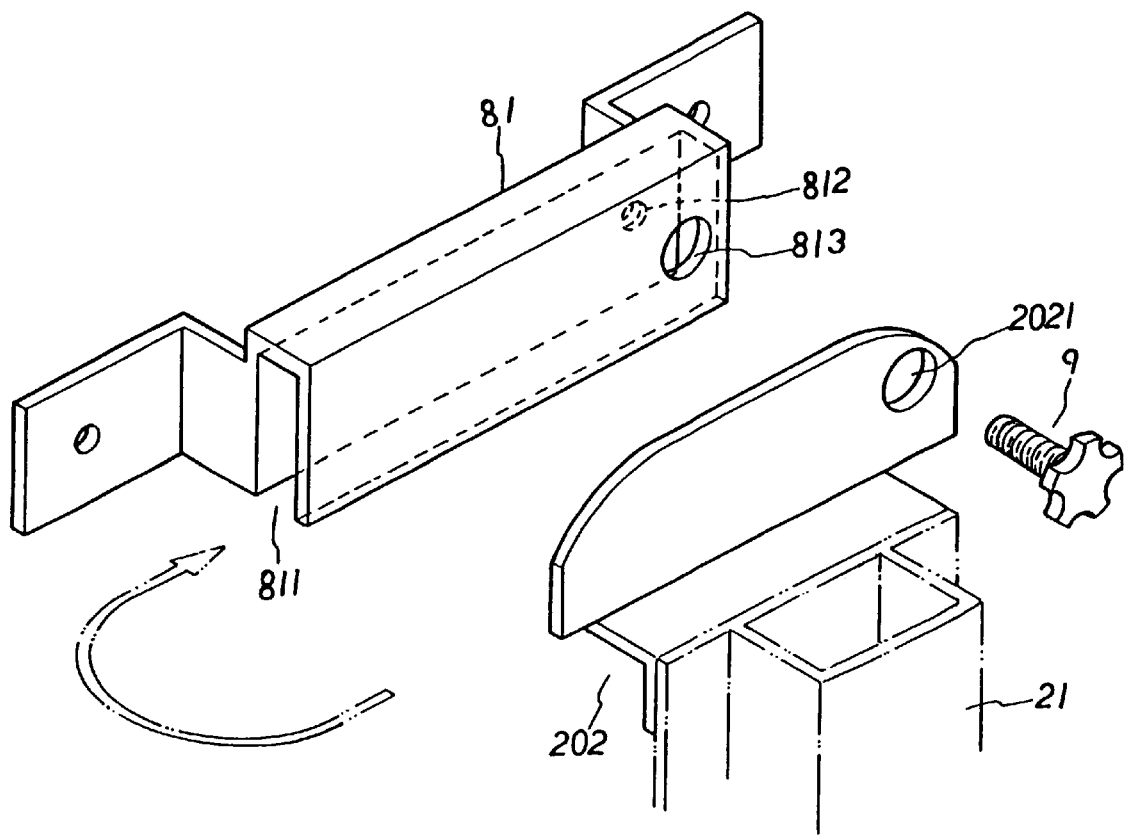
F I G. 5

COLLAPSIBLE GOLF TROLLEY

BACKGROUND OF THE INVENTION

The present invention relates to a collapsible golf trolley. More particularly, the present invention relates to a collapsible frame device of a golf trolley.

Referring to FIGS. 1 and 2, a conventional collapsible golf trolley has an upper frame 11, a lower frame 12, and a generally U-shaped upper joint 18 connected to a lower end of the upper frame 11 and an upper portion of the lower frame 12. A shaft 111 is disposed on an upper end of the lower frame 12. A positioning fastener A is disposed on a lower portion of the upper frame 11. An upper bracket 132 is disposed on the upper portion of the lower frame 12. A lower seat 131 is disposed on a lower end of the lower frame 12. A handle 19 is disposed on an upper end of the upper frame 11. A lower joint 14 is disposed on a middle portion of the lower frame 12. Two support frames 15 are connected to the lower joint 14. Each support frame 38 is connected to a wheel connector 10 which is connected to a wheel 16. Two pull rods 17 are connected to the upper frame 11 and the respective support frames 15. When the upper frame 11 is rotated downward, it is necessary to provide a large room. When the upper frame 11 is extended, the positioning fastener A engages with the shaft 111 in order to position the upper frame 11 stably. However, the upper frame 11 cannot be positioned stably while the upper frame 11 is folded.

SUMMARY OF THE INVENTION

An object of the present invention is to provide a collapsible golf trolley which is easily folded.

Another object of the present invention is to provide a collapsible golf trolley which is easily operated.

In accordance with a first preferred embodiment of the present invention, a collapsible golf trolley comprises a collapsible frame device and a bag disposed on the collapsible frame device. The bag has an upper cap, two protective pads, and two belts. The collapsible frame device comprises an outer pipe, an inner pipe inserted in the outer pipe, a lower joint disposed on a middle portion of the outer pipe, two support frames connected to the lower joint, each of the support frames connected to a wheel connector, the wheel connector connected to a wheel, and two pull rods. A rope is connected to the support frames. A handle is disposed on a top end of the inner pipe. A releasing device is disposed on the outer pipe. The outer pipe has a lateral plate and two L-shaped plates. The L-shaped plates are located at a lower portion of the outer pipe. A spacing is formed between the L-shaped plates. A slide block is disposed on the outer pipe to be slide along the spacing. The slide block has two guide grooves engaging with the L-shaped plates. A recess hole is formed on a top portion of the slide block. Two pivot couplers are disposed on the slide block. Each of the pivot couplers has a notch receiving an end of the respective pull rod. Each of the pull rods is connected to the respective pivot coupler and the respective support frame. A plug block is inserted in a lower end of the inner pipe. The plug block has a through hole. A driven rod has a first bent end inserted in the recess hole of the slide block and a second bent end inserted through the through hole of the plug block. The inner pipe has an oblong hole and a positioning aperture. A positioning block is disposed in the inner pipe. The positioning block has a main seat, a positioning pin device, a first coiled spring, a blocking pin device, a second coiled spring, an upper cover, and a rectangular plate. The main seat has a transverse opening, a transverse hole communicating with the transverse opening, a longitudinal opening, and a longitudinal hole communicating with the longitudinal opening and the transverse opening. The first coiled spring surrounds a portion of the positioning pin device. The positioning pin device has a shank inserted in the transverse hole and an annular flange inserted in the transverse opening. The second coiled spring surrounds a portion of the blocking pin device. The blocking pin device has a blocking rod inserted in the longitudinal hole and a solid cylinder inserted in the longitudinal opening. The solid cylinder has two round apertures. The upper cover covers a top portion of the main seat. The rectangular plate is disposed on the main seat. The rectangular plate faces the oblong hole of the inner pipe. The outer pipe further has a blocking bar, two retainer grooves, and a positioning hole. A hollow casing is disposed in a top end of the outer pipe to receive the inner pipe. The hollow casing has two elastic bars. Each of the elastic bars is inserted in the respective retainer groove. The releasing device has a main mount, the main mount having a hollow interior, and a button disposed in the hollow interior of the main mount. The button has a pressing head protruding outward the main mount, a hollow cylinder, and a center post inserted in a third coiled spring. The center post matches the positioning hole of the outer pipe. When the shank of the positioning pin device enters the positioning hole of the outer pipe, the inner pipe will not be moved, and the blocking rod contacts the annular flange of the positioning pin device. When the pressing head is pressed inward, the center post forces the shank of the positioning pin device disengages from the positioning hole, and the blocking rod blocks the annular flange of the positioning pin device so that the inner pipe will be pulled out of the outer pipe.

In accordance with a second preferred embodiment of the present invention, a collapsible golf trolley comprises a collapsible frame device and a bag disposed on the collapsible frame device. The bag has an upper cap, two protective pads, and two belts. The collapsible frame device comprises an outer pipe, an inner pipe inserted in the outer pipe, a lower joint disposed on a middle portion of the outer pipe, two support frames connected to the lower joint, each of the support frames connected to a wheel connector, the wheel connector connected to a wheel, and two pull rods. A rope is connected to the support frames. A handle is disposed on a top end of the inner pipe. A releasing device is disposed on the outer pipe. The outer pipe has a lateral plate and two L-shaped plates. The L-shaped plates are located at a lower portion of the outer pipe. A spacing is formed between the L-shaped plates. A slide block is disposed on the outer pipe to be slide along the spacing. The slide block has two guide grooves engaging with the L-shaped plates. A recess hole is formed on a top portion of the slide block. Two pivot couplers are disposed on the slide block. Each of the pivot couplers has a notch receiving an end of the respective pull rod. Each of the pull rods is connected to the respective pivot coupler and the respective support frame. A plug block is inserted in a lower end of the inner pipe. The plug block has a through hole. A driven rod has a first bent end inserted in the recess hole of the slide block and a second bent end inserted through the through hole of the plug block. The inner pipe has an oblong hole and a positioning aperture. A positioning block is disposed in the inner pipe. The positioning block has a main seat, a positioning pin device, a first coiled spring, a blocking pin device, a second coiled spring, an upper cover, and a rectangular plate. The main seat has a transverse opening, a transverse hole communicating with the transverse opening, a longitudinal opening, and a longitudinal hole communicating with the longitudinal opening and the transverse opening. The first coiled spring surrounds a portion of the positioning pin device. The positioning pin device has a shank inserted in the transverse hole and an annular flange inserted in the transverse opening. The second coiled spring surrounds a portion of the blocking pin device. The blocking pin device has a blocking rod inserted in the longitudinal hole and a solid cylinder inserted in the longitudinal opening. The solid cylinder has two round apertures. The upper cover covers a top portion of the main seat. The rectangular plate is disposed on the main seat. The rectangular plate faces the oblong hole of the inner pipe. The outer pipe further has a blocking bar, two retainer grooves, and a positioning hole. A hollow casing is disposed in a top end of the outer pipe to receive the inner pipe. The hollow casing has two elastic bars. Each of the elastic bars is inserted in the respective retainer groove. The releasing device has a main mount, an inner block disposed in the main mount, a compression spring disposed between the main mount and the inner block, and a control rod inserted through the main mount. The inner block has a bevel and a center post. The control rod has a bevel end engaging with the bevel of the inner block. When the control rod moves upward, the center post enters the positioning hole of the outer pipe and the positioning aperture of the inner pipe so that the inner pipe will not be moved. When the control rod moves downward, the center post disengages from the positioning hole of the outer pipe and the positioning aperture of the inner pipe so that the inner pipe will be moved.

BRIEF DESCRIPTION OF THE DRAWINGS

FIG. 5 is a perspective exploded view of an upper seat and an upper fixed plate of a preferred embodiment in accordance with the present invention;

DETAILED DESCRIPTION OF THE INVENTION

Figure 1:
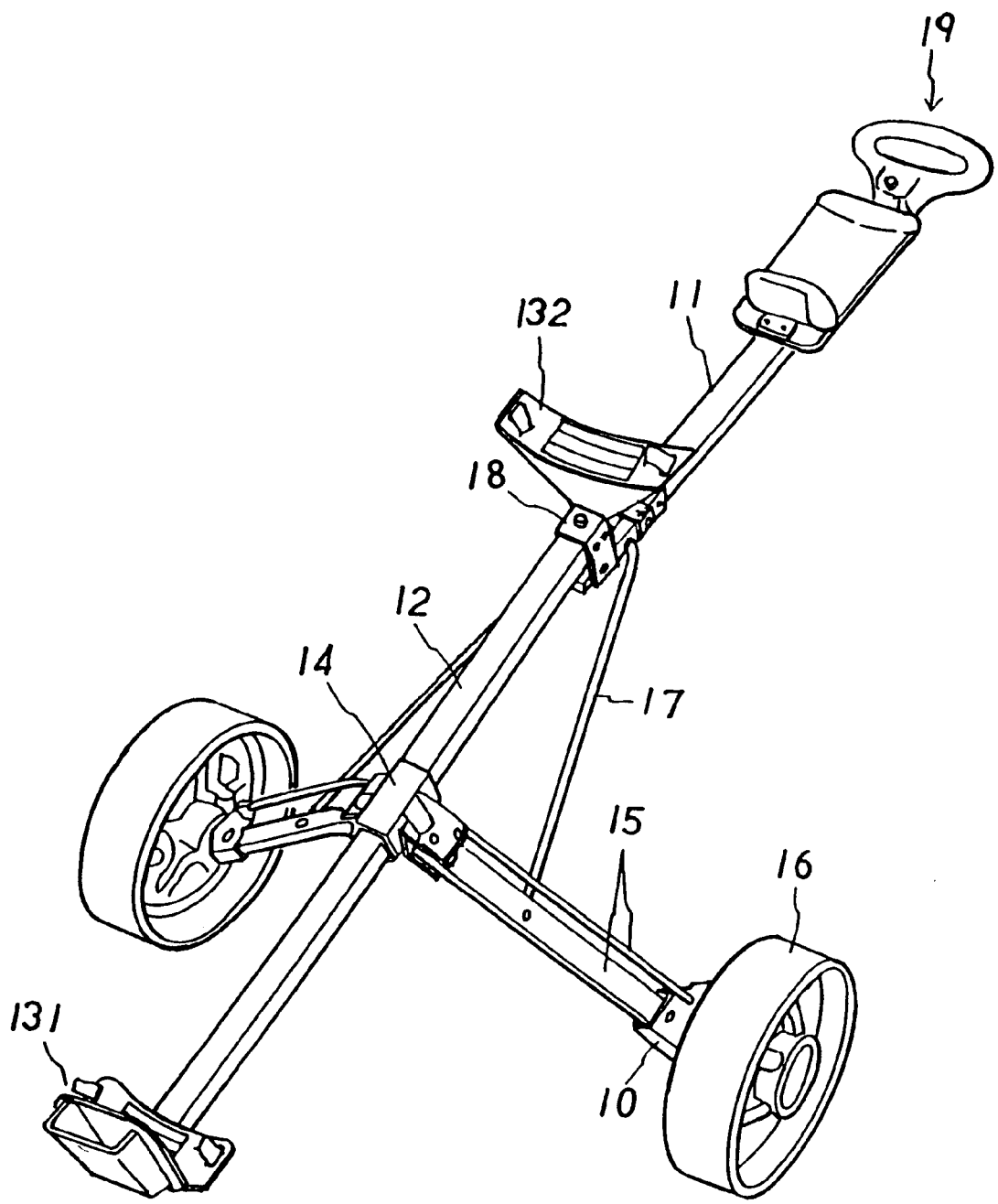
FIG. 1 is a perspective assembly view of a conventional collapsible golf trolley of the prior art.
Figure 2:
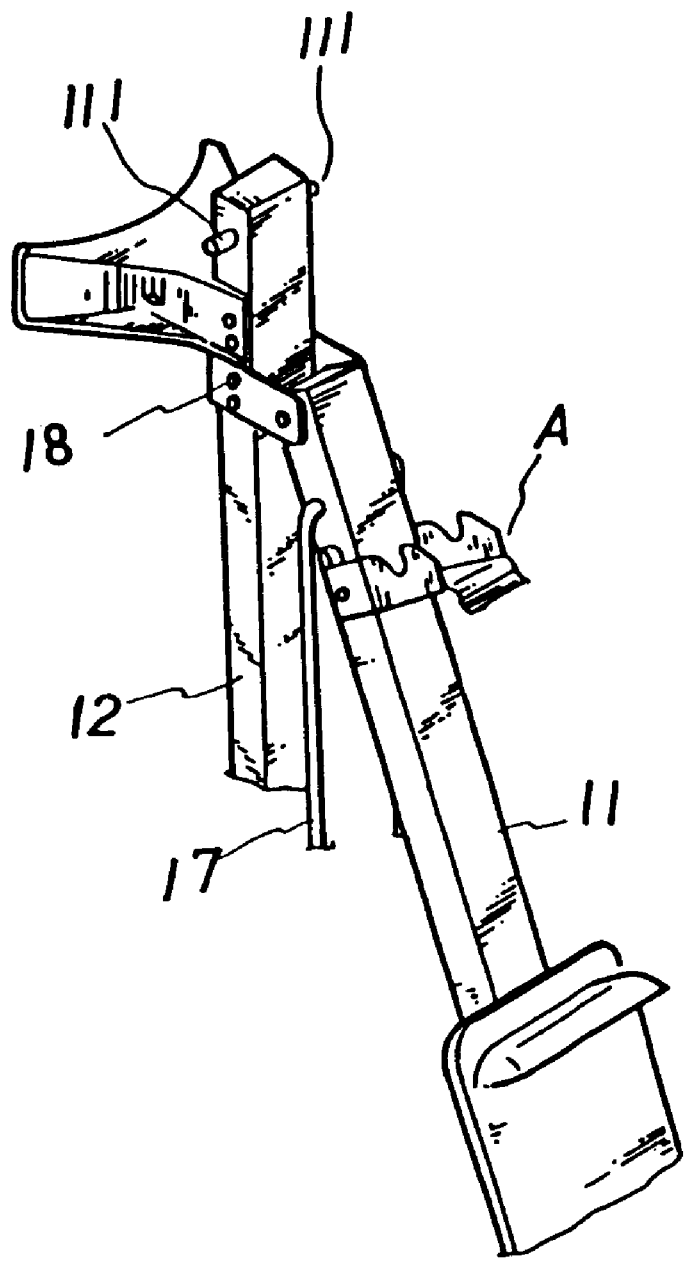
FIG. 2 is a partially perspective schematic view illustrating a conventional collapsible golf trolley of the prior art is folded.
Figure 3:
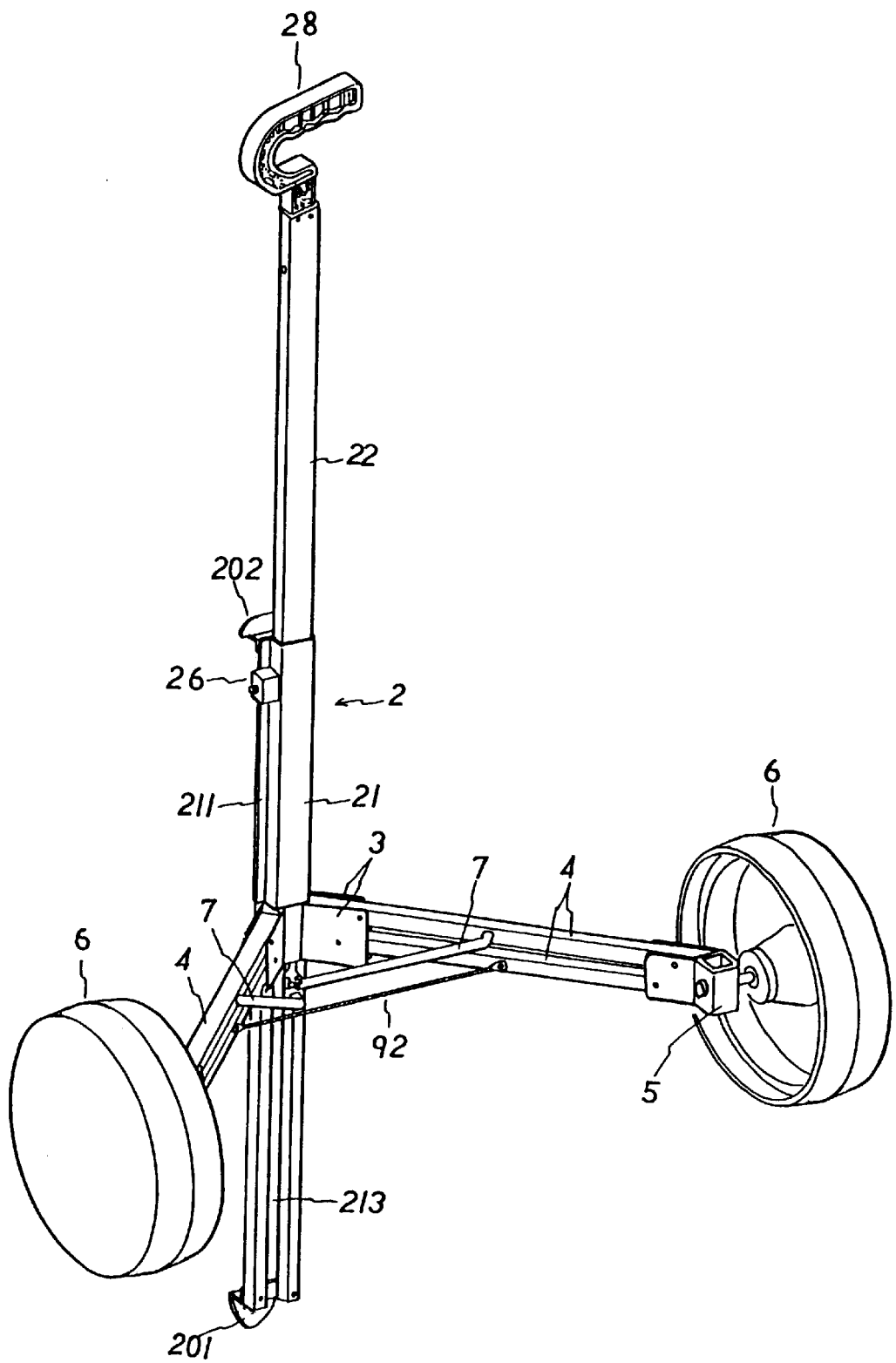
FIG. 3 is a perspective assembly view of a collapsible golf trolley of a preferred embodiment in accordance with the present invention.

Referring to FIGS. 3 to 19, a collapsible golf trolley comprises a collapsible frame device 2 and a bag 8 disposed on the collapsible frame device 2. The bag 8 has an upper cap 85, two protective pads 83, and two belts 84.

The collapsible frame device 2 comprises an outer pipe 21, an inner pipe 22 inserted in the outer pipe 21, a lower joint 3 disposed on a middle portion of the outer pipe 21, two support frames 4 connected to the lower joint 3, each of the support frames 4 connected to a wheel connector 5, the wheel connector 5 connected to a wheel 6, and two pull rods 7.

A rope 92 is connected to the support frames 4.

A handle 28 is disposed on a top end of the inner pipe 22.

A releasing device 26 is disposed on the outer pipe 21.

The outer pipe 21 has a lateral plate 211 and two L-shaped plates 214. The L-shaped plates 214 are located at a lower portion of the outer pipe 21. A spacing 213 is formed between the L-shaped plates 214. A slide block 23 is disposed on the outer pipe 21 to be slide along the spacing 213. The slide block 23 has two guide grooves 231 engaging with the L-shaped plates 214. A recess hole 234 is formed on a top portion of the slide block 23.

Two pivot couplers 232 are disposed on the slide block 23. Each of the pivot couplers 232 has a notch 233 receiving an end of the respective pull rod 7. Each of the pull rods 7 is connected to the respective pivot coupler 232 and the respective support frame 4.

A plug block 25 is inserted in a lower end of the inner pipe 22. The plug block 25 has a through hole 251. A driven rod 24 has a first bent end 241 inserted in the recess hole 234 of the slide block 23 and a second bent end 242 inserted through the through hole 251 of the plug block 25.

The inner pipe 22 has an oblong hole 221 and a positioning aperture 220.

A positioning block 27 is disposed in the inner pipe 22. The positioning block 27 has a main seat 271, a positioning pin device 272, a first coiled spring 273, a blocking pin device 274, a second coiled spring 275, an upper cover 276, and a rectangular plate 277.

The main seat 271 has a transverse opening 2711, a transverse hole 2712 communicating with the transverse opening 2711, a longitudinal opening 2713, and a longitudinal hole 2714 communicating with the longitudinal opening 2713 and the transverse opening 2711.

The first coiled spring 273 surrounds a portion of the positioning pin device 272. The positioning pin device 272 has a shank 2721 inserted in the transverse hole 2712 and an annular flange 2723 inserted in the transverse opening 2711.

The second coiled spring 275 surrounds a portion of the blocking pin device 274. The blocking pin device 274 has a blocking rod 2741 inserted in the longitudinal hole 2714 and a solid cylinder 2742 inserted in the longitudinal opening 2713. The solid cylinder 2742 has two round apertures 2740.

The upper cover 276 covers a top portion of the main seat 271.

The rectangular plate 277 is disposed on the main seat 271.

The rectangular plate 277 faces the oblong hole 221 of the inner pipe 22.

The outer pipe 21 further has a blocking bar 215, two retainer grooves 212, and a positioning hole 210.

A hollow casing 29 is disposed in a top end of the outer pipe 21 to receive the inner pipe 22. The hollow casing 29 has two elastic bars 291. Each of the elastic bars 291 is inserted in the respective retainer groove 212.

The releasing device 26 has a main mount 261, the main mount 261 having a hollow interior 2631, and a button 263 disposed in the hollow interior 2631 of the main mount 261.

The button 263 has a pressing head 2632 protruding outward the main mount 261, a hollow cylinder 2631, and a center post 2633 inserted in a third coiled spring 262. The center post 2633 matches the positioning hole 210 of the outer pipe 21.

Referring to FIG. 15 again, the shank 2721 of the positioning pin device 272 enters the positioning hole 210 of the outer pipe 21 so that the inner pipe 22 cannot be moved. The blocking rod 2741 contacts the annular flange 2723 of the positioning pin device 272.

When the pressing head 2632 is pressed inward, the center post 2633 forces the shank 2721 of the positioning pin device 272 disengages from the positioning hole 210. The blocking rod 2741 blocks the annular flange 2723 of the positioning pin device 272 so that the inner pipe 22 can be pulled out of the outer pipe 21.

Figure 4:
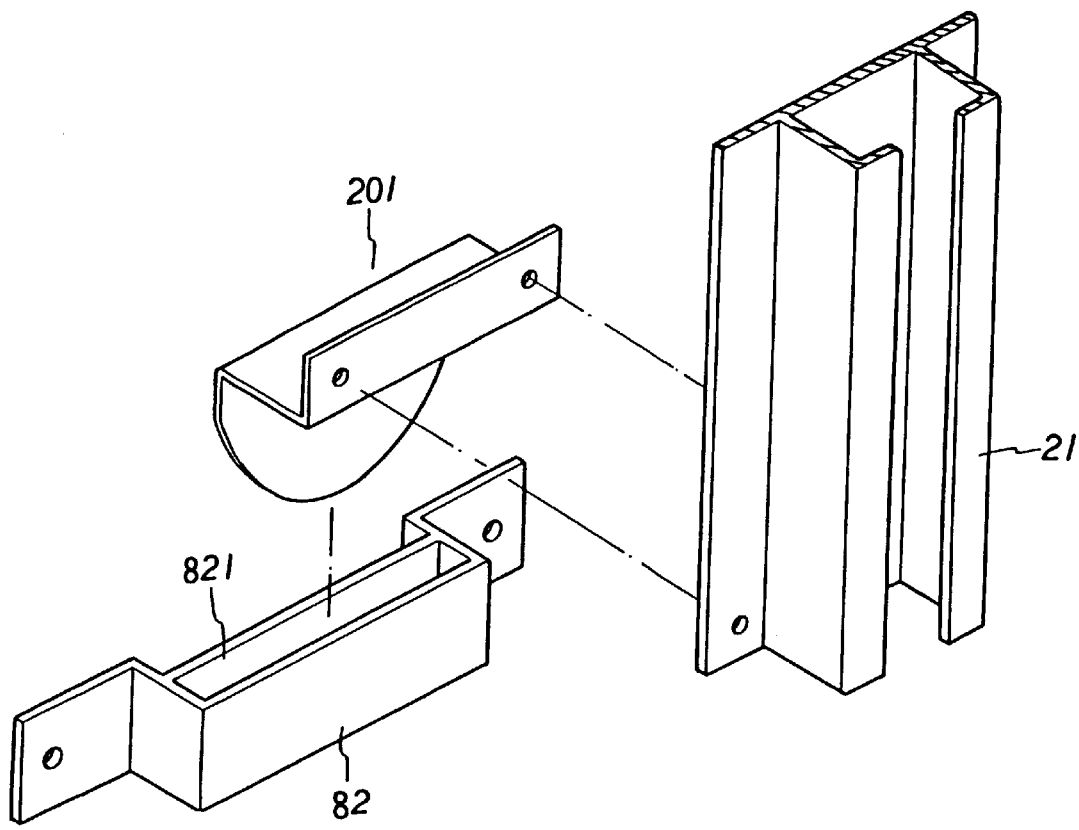
FIG. 4 is a perspective exploded view of an outer pipe, a lower seat, and a lower fixed plate of a preferred embodiment in accordance with the present invention.
Figure 6:
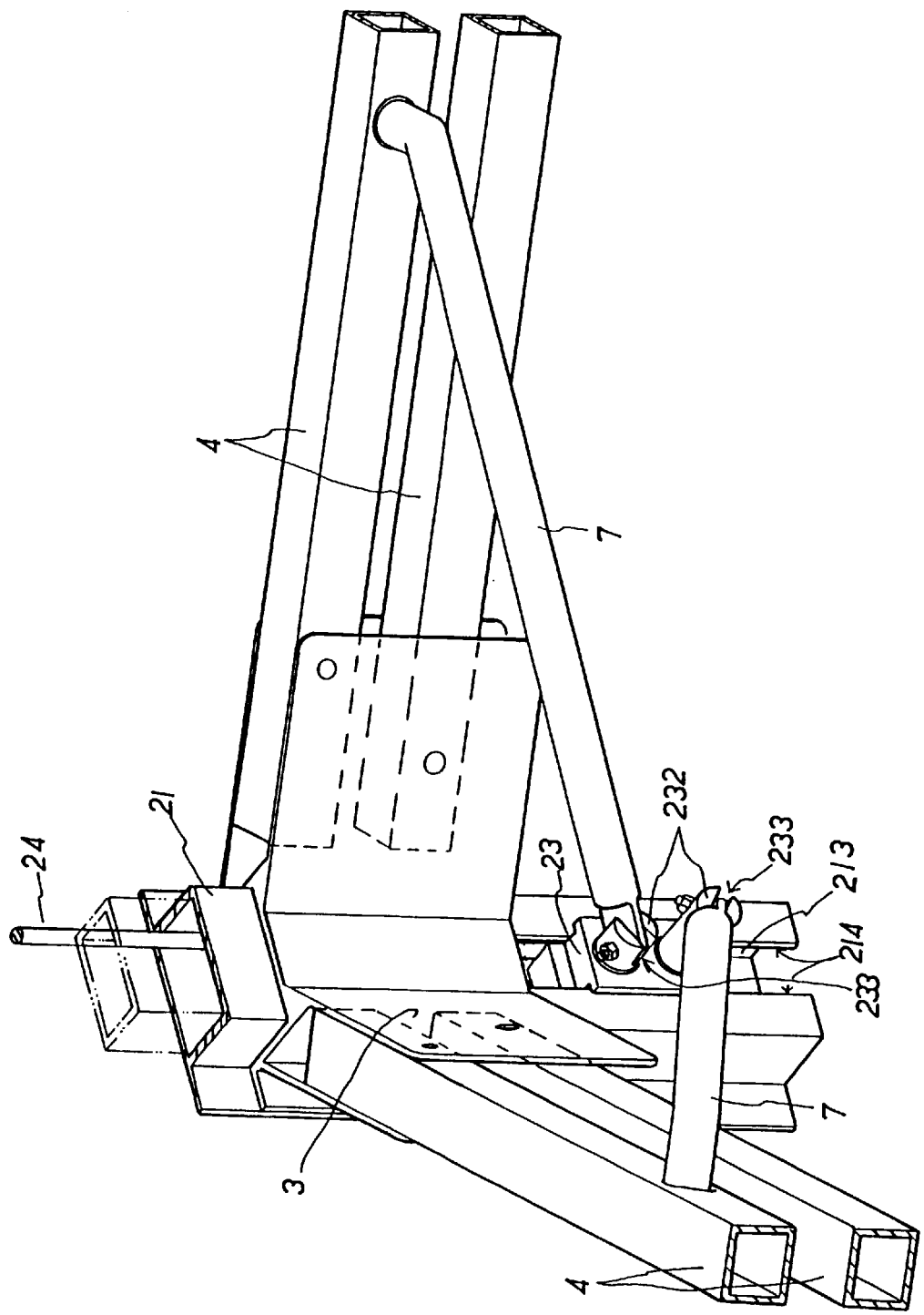
FIG. 6 is a partially perspective assembly view of an outer pipe, a pull rod, and two support frames of a preferred embodiment in accordance with the present invention.
Figure 7:
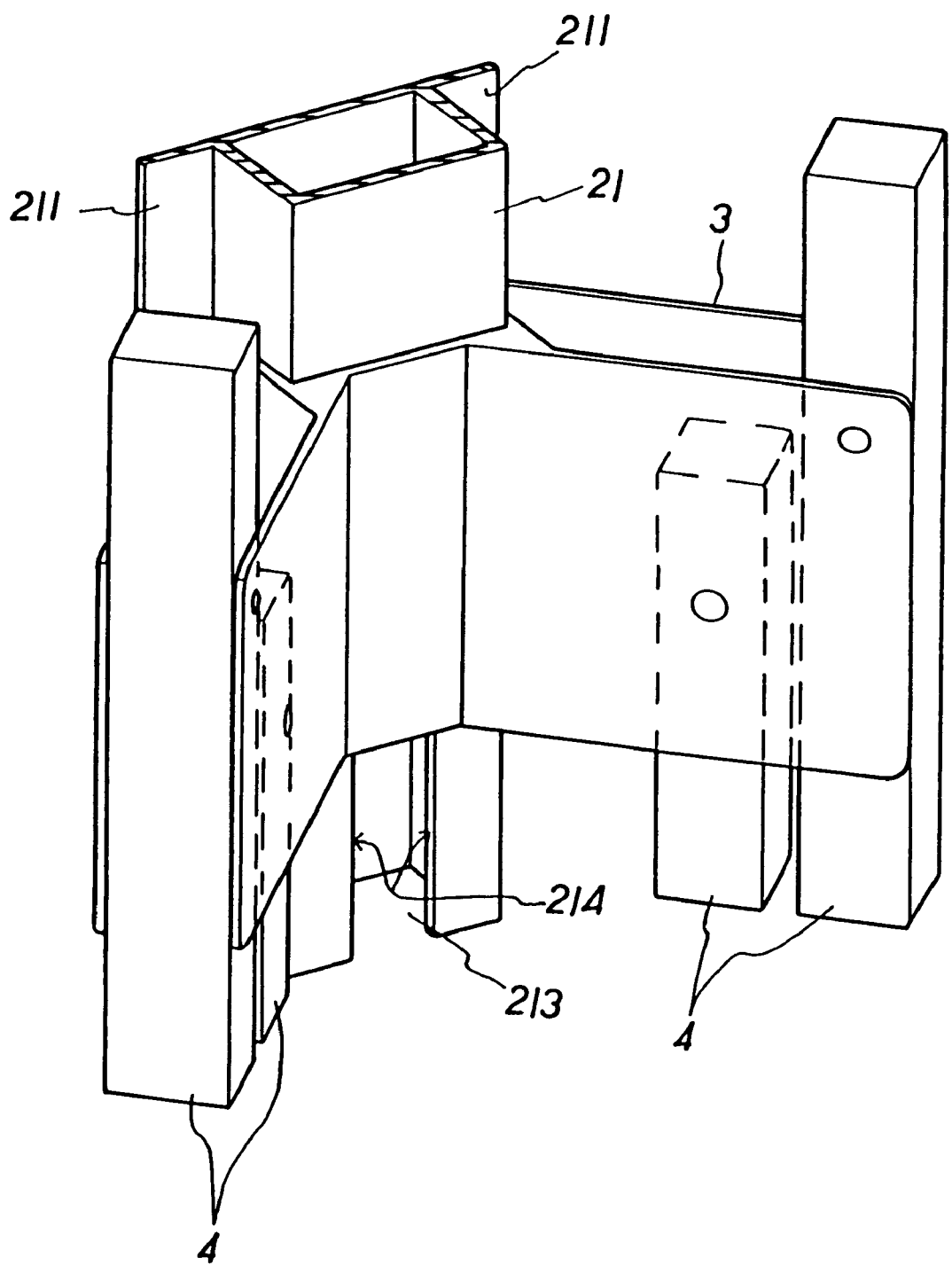
FIG. 7 is a partially perspective assembly view of an outer pipe and two support frames of a preferred embodiment in accordance with the present invention.
Figure 8:
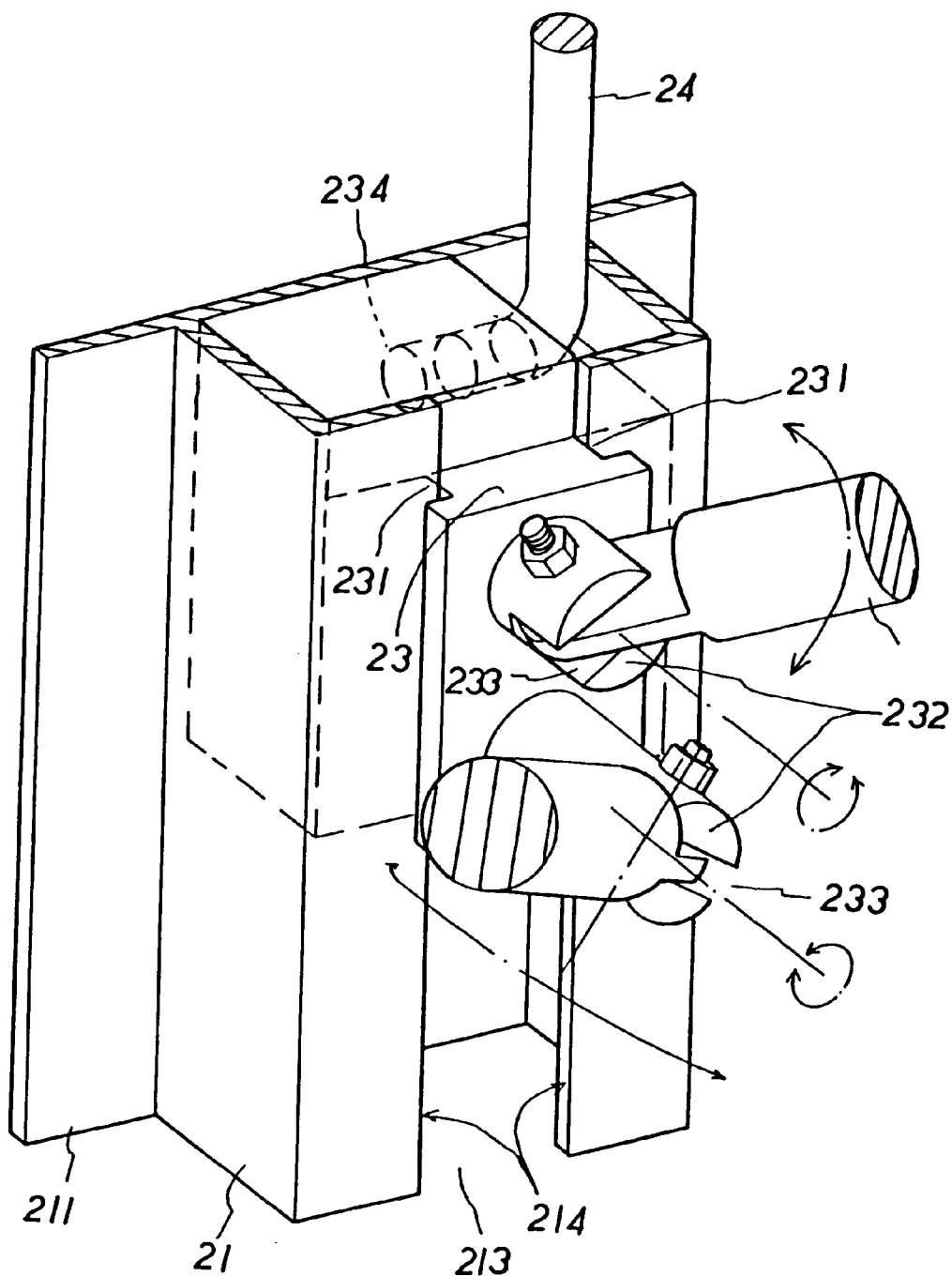
FIG. 8 is a partially perspective schematic view illustrating an operation of a slide block, a pivot shaft, and an outer pipe of a preferred embodiment in accordance with the present invention.
Figure 9:
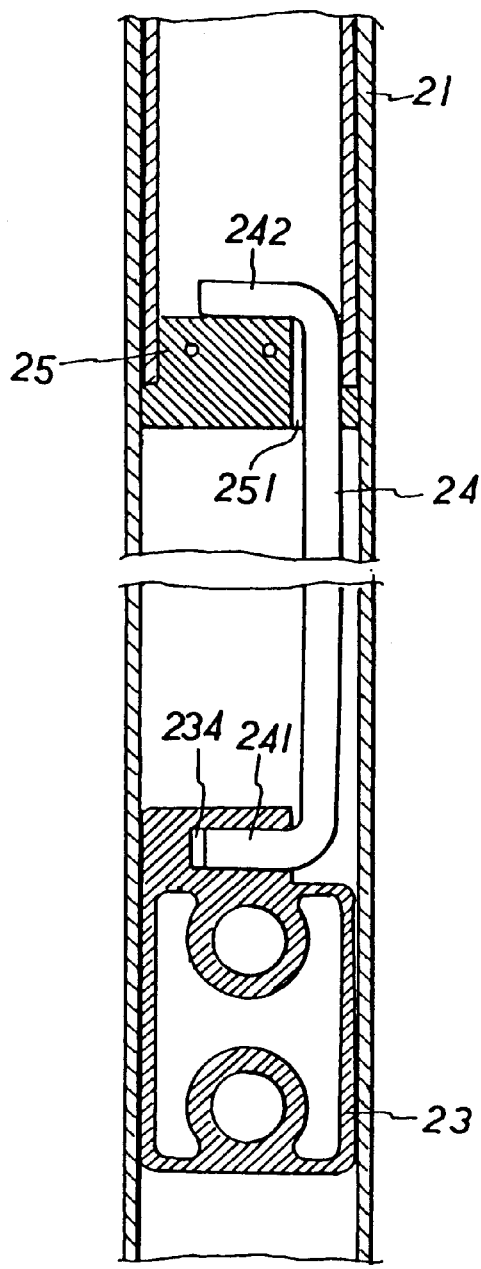
FIG. 9 is a sectional schematic view illustrating an operation of an inner pipe of a preferred embodiment while the inner pipe is pulled.
Figure 10:
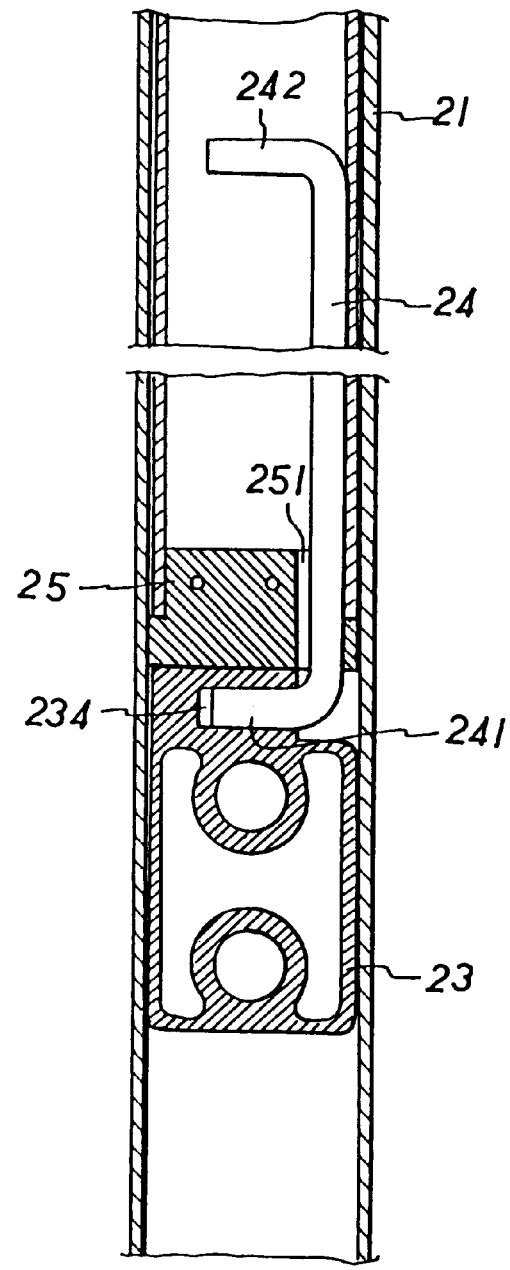
FIG. 10 is a sectional schematic view illustrating an operation of an inner pipe of a preferred embodiment while the inner pipe is pushed.
Figure 11:
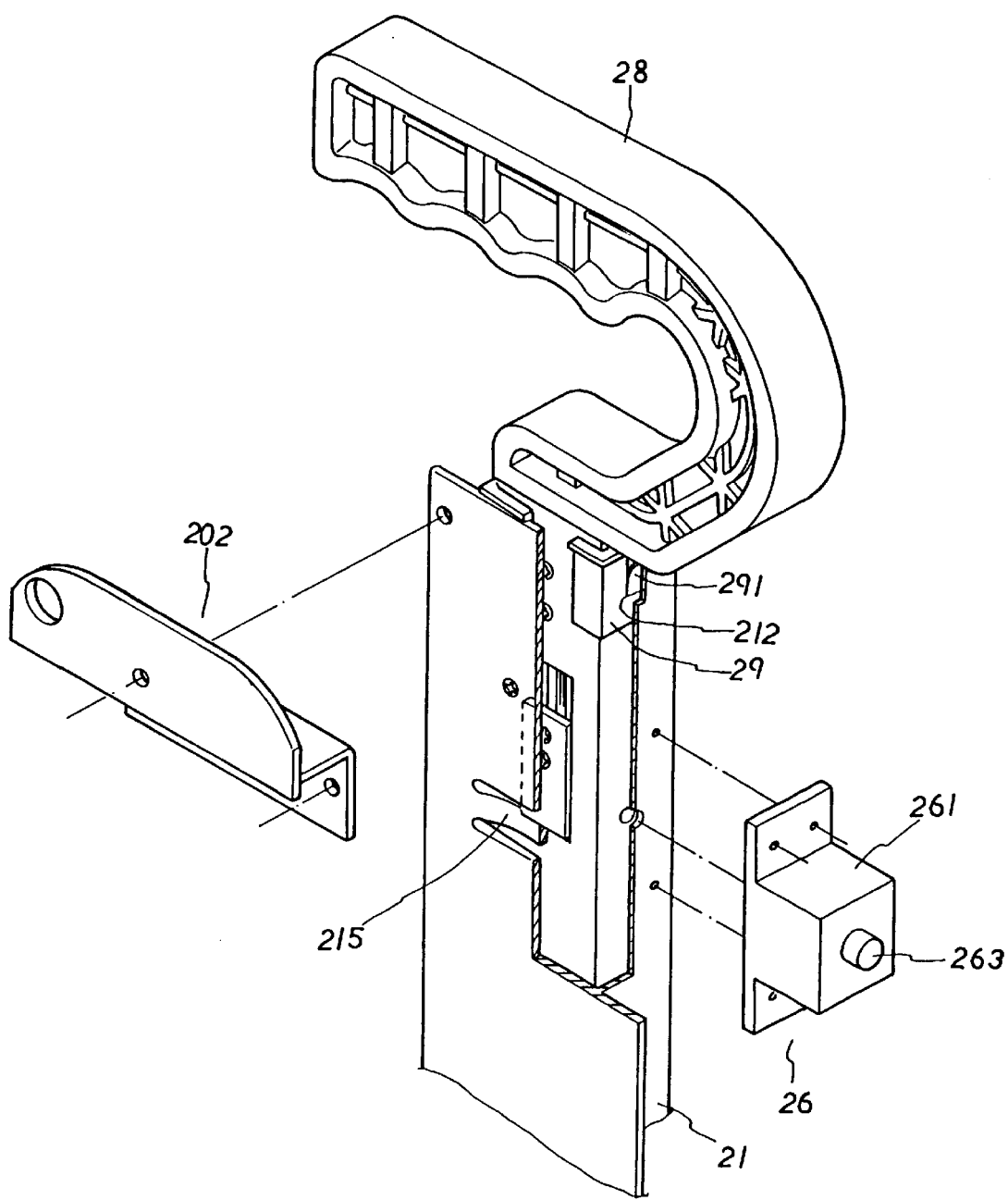
FIG. 11 is a partially perspective exploded view of an outer pipe, an upper fixed plate, and a releasing device of a preferred embodiment in accordance with the present invention.
Figure 12:
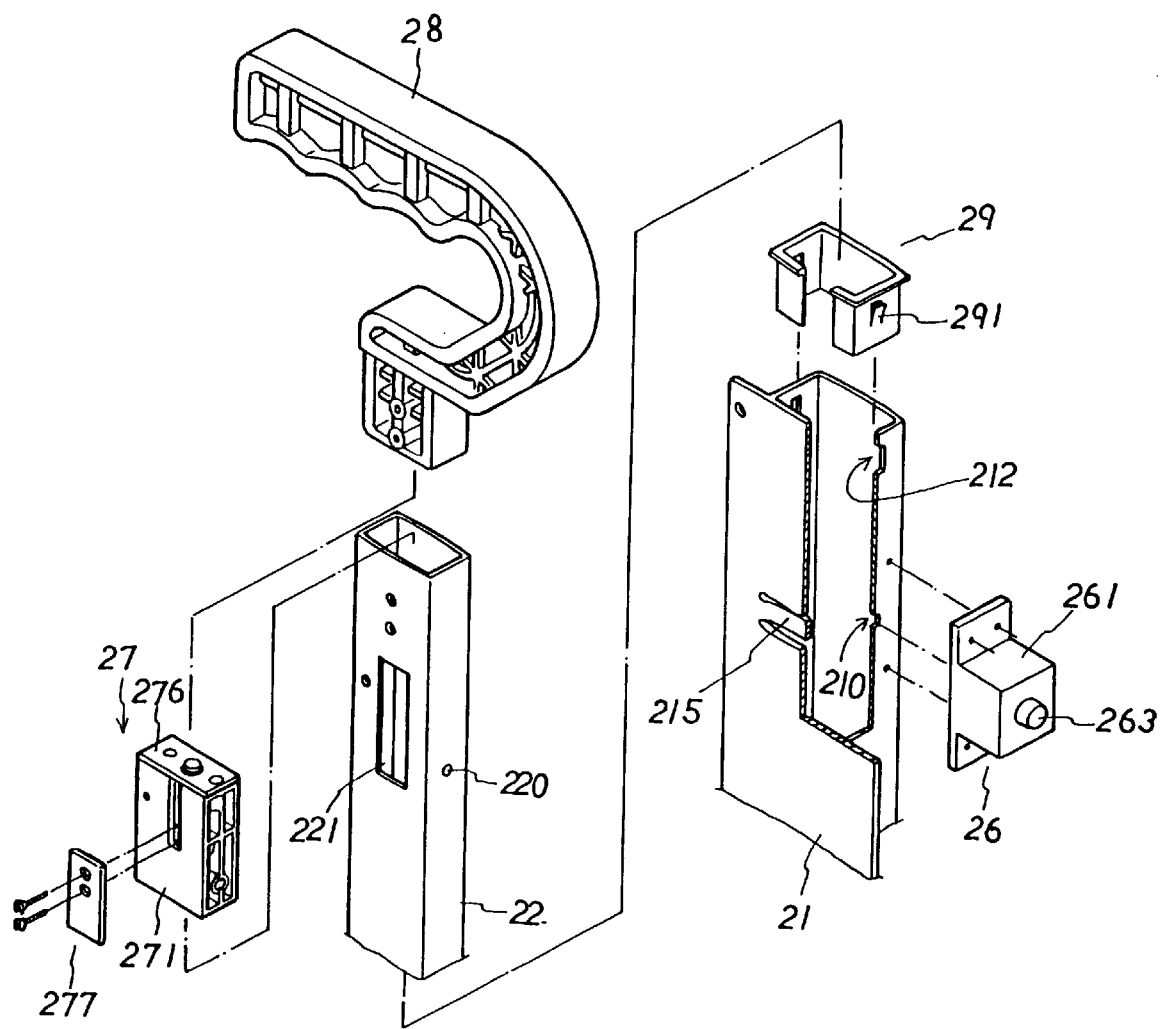
FIG. 12 is a perspective exploded view of an outer pipe, a handle, an inner pipe, a positioning block, and a releasing device of a preferred embodiment in accordance with the present invention.
Figure 13:
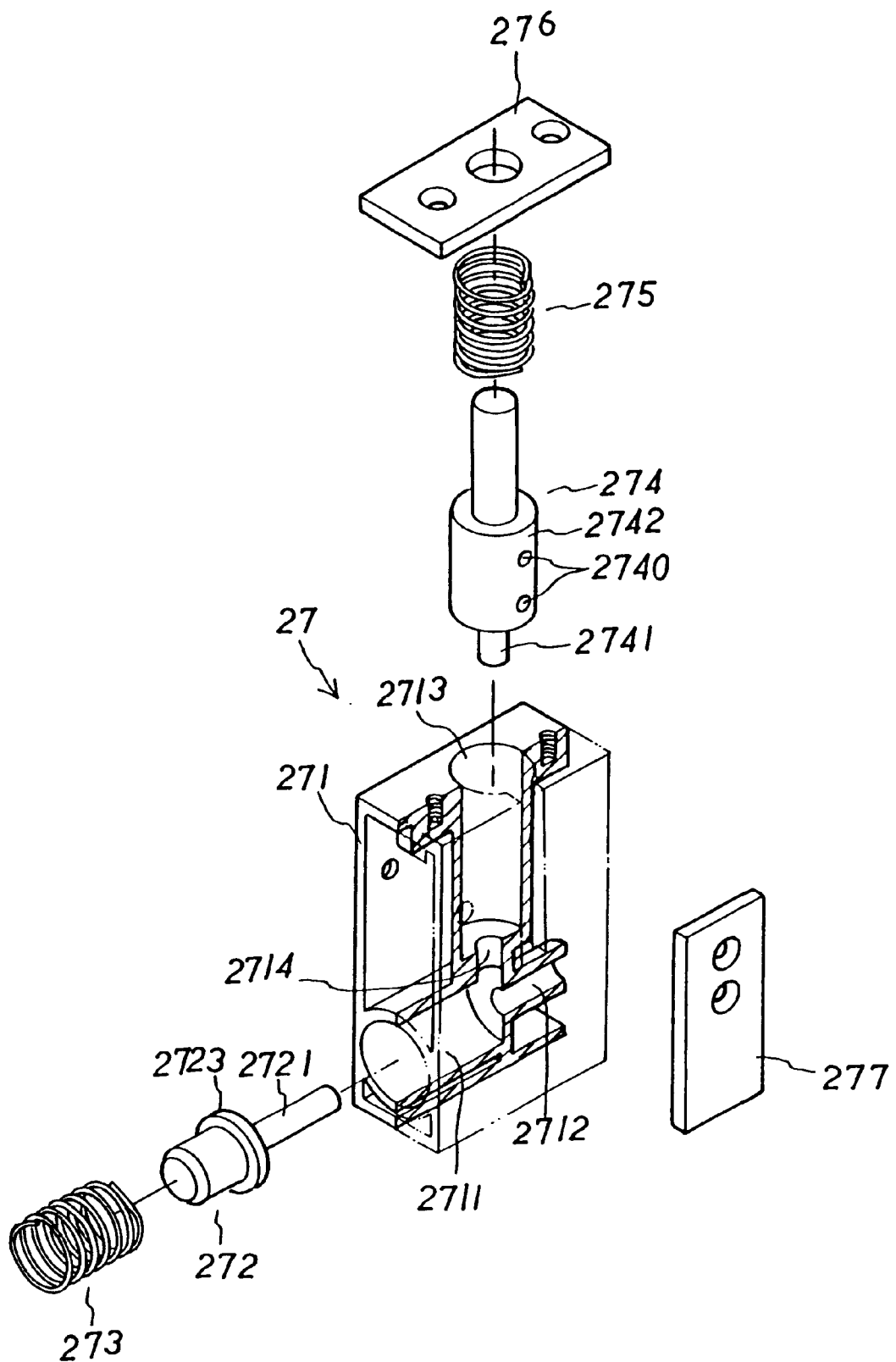
FIG. 13 is a perspective exploded view of a positioning block of a preferred embodiment in accordance with the present invention.
Figure 15:
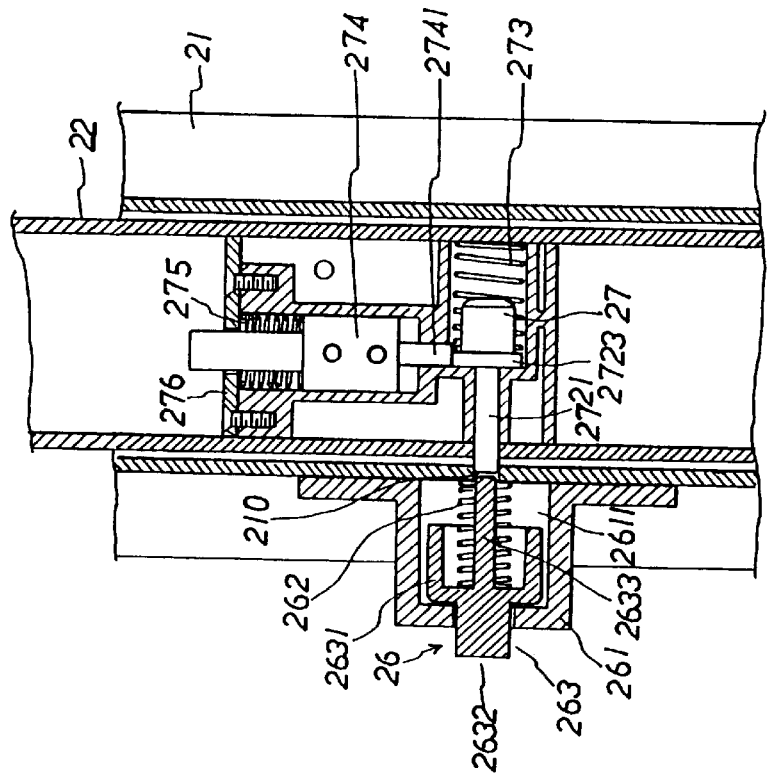
FIG. 15 is a sectional schematic view illustrating another operation of a positioning block of a preferred embodiment in accordance with the present invention.
Figure 14:
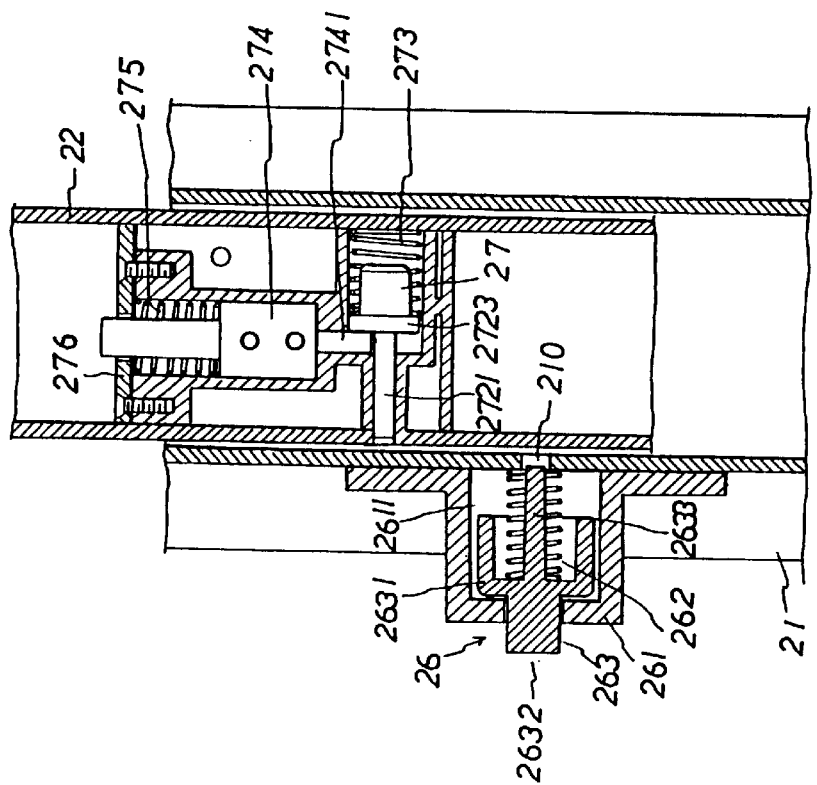
FIG. 14 is a sectional schematic view illustrating an operation of a positioning block of a preferred embodiment in accordance with the present invention.
Figure 16:
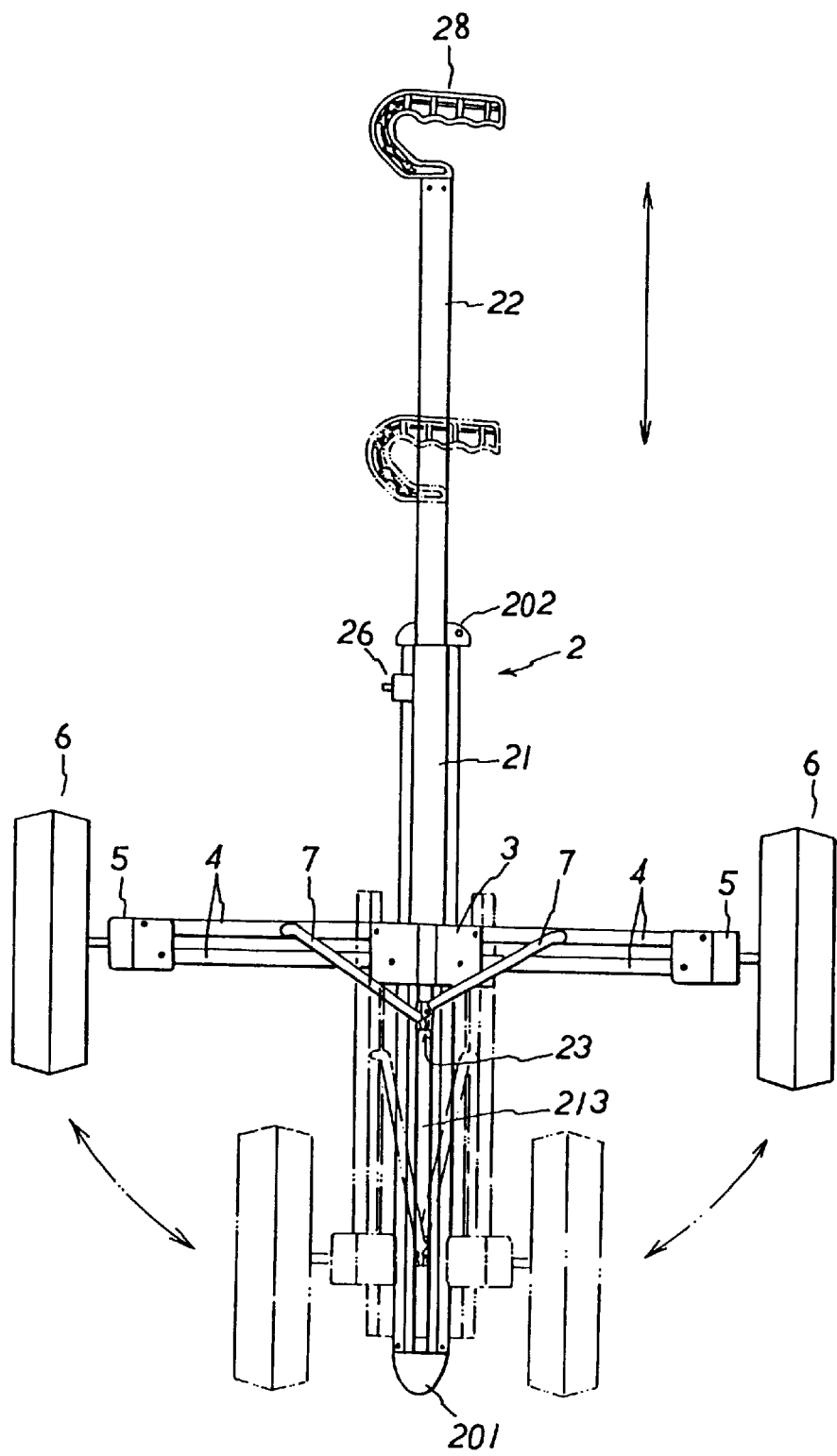
FIG. 16 is a schematic view illustrating a folding of a collapsible golf trolley of a preferred embodiment in accordance with the present invention.
Figure 17:
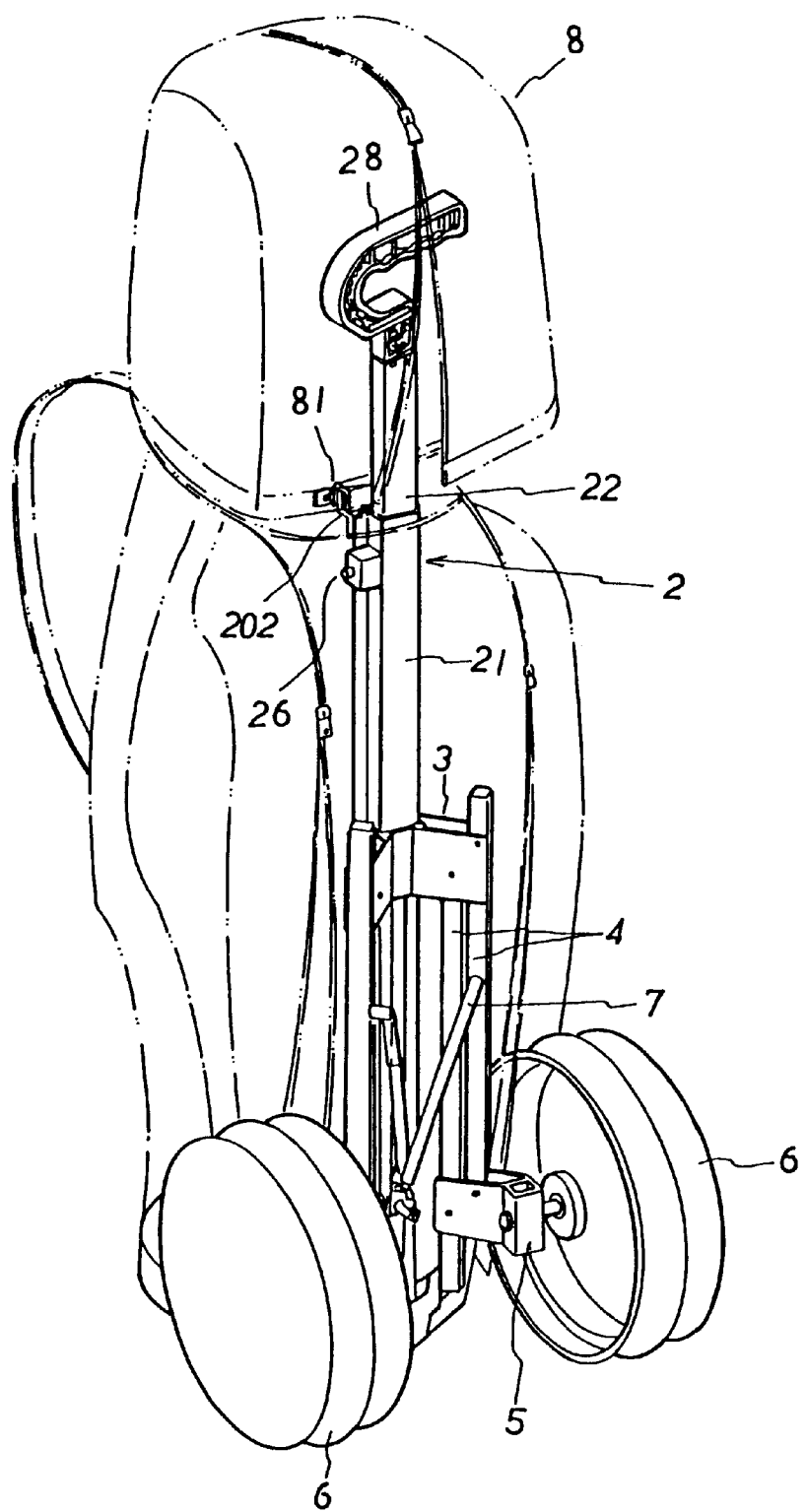
FIG. 17 is a schematic view illustrating a collapsible golf trolley of a preferred embodiment is folded.
Figure 18:
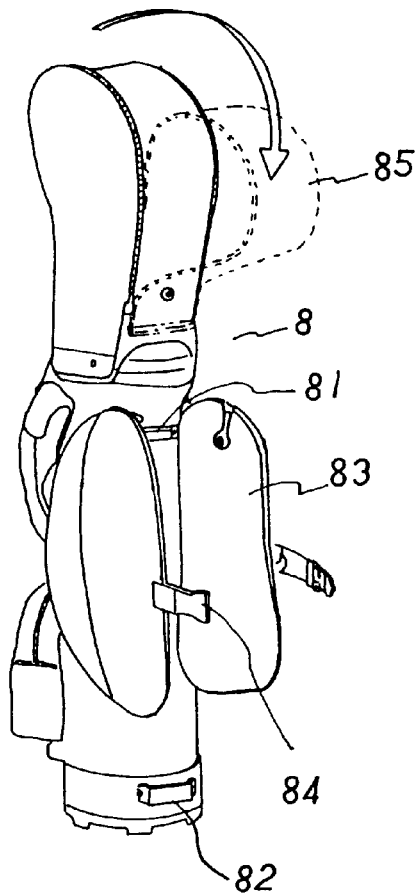
FIG. 18 is a perspective view of a bag of a preferred embodiment in accordance with the present invention.
Figure 19:
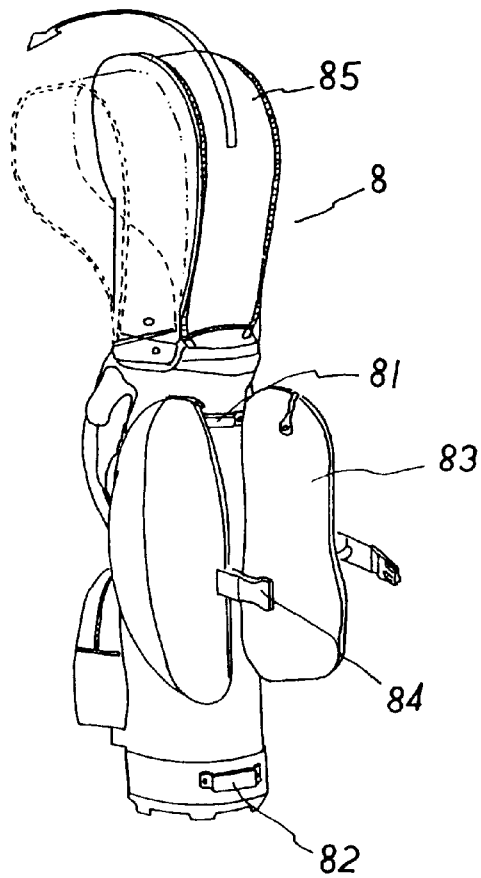
FIG. 19 is another perspective view of a bag of a preferred embodiment in accordance with the present invention.

Referring to FIGS. 1 and 4, a lower fixed plate 201 is fastened on a bottom end of the outer pipe 21. A lower seat 82 has a slot 821 receiving a lower portion of the lower fixed plate 201.

Referring to FIGS. 1 and 5, an upper fixed plate 202 is fastened on an upper end of the outer pipe 21. An upper seat 81 has a recess groove 811 receiving an upper portion of the upper fixed plate 202, a threaded aperture 812, and a round hole 813.

The upper fixed plate 202 has a circular hole 2021 matching the round hole 813 of the upper seat 81. A bolt 9 fastens the upper fixed plate 202 and the upper seat 81 together via the circular hole 2021 of the upper fixed plate 202 and the round hole 813 of the upper seat 81.

Figure 20:
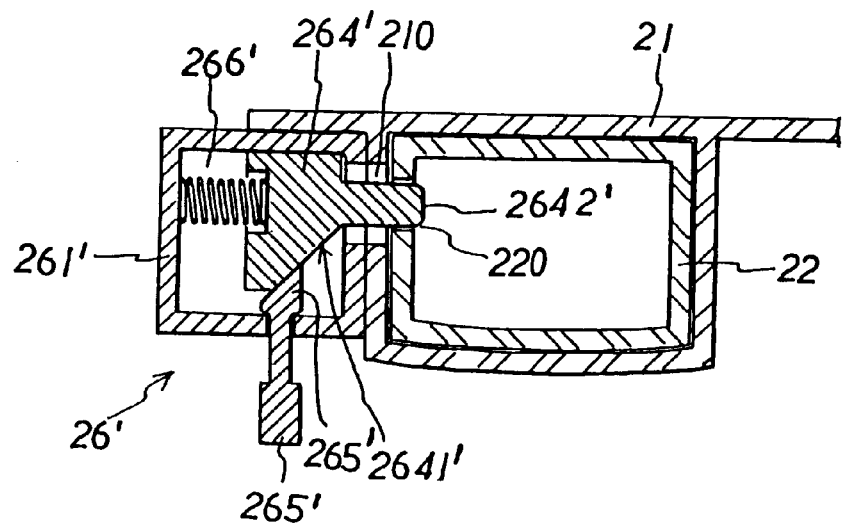
FIG. 20 is a sectional assembly view of a positioning block of another preferred embodiment in accordance with the present invention.
Figure 21:
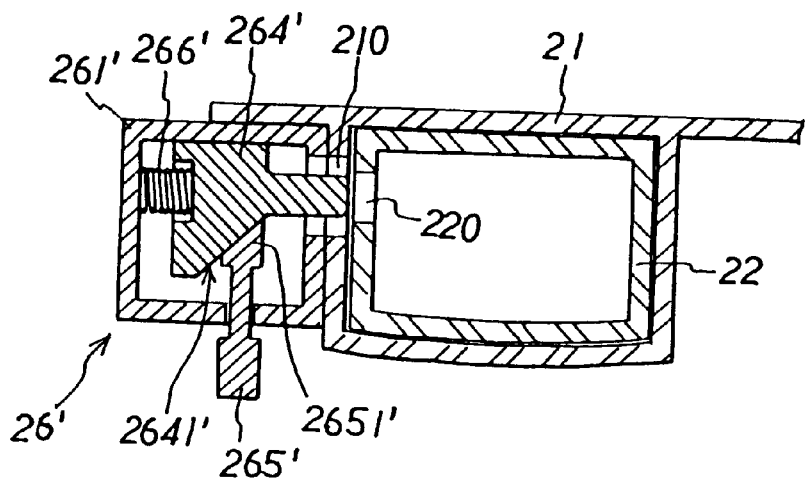
FIG. 21 is a sectional schematic view illustrating an operation of a positioning block of another preferred embodiment in accordance with the present invention.

Referring to FIGS. 20 and 21, another releasing device 26' is disposed on the outer pipe 21. The releasing device 26' has a main mount 261', an inner block 264' disposed in the main mount 261', a compression spring 266' disposed between the main mount 261' and the inner block 264', and a control rod 265' inserted through the main mount 261'.

The inner block 264' has a bevel 2641' and a center post 2642'.

The control rod 265' has a bevel end 2651' engaging with the bevel 2641' of the inner block 264'.

When the control rod 265' moves upward, the center post 2642' enters the positioning hole 210 of the outer pipe 21 and the positioning aperture 220 of the inner pipe 22 so that the inner pipe 22 will not be moved.

When the control rod 265' moves downward, the center post 2642' disengages from the positioning hole 210 of the outer pipe 21 and the positioning aperture 220 of the inner pipe 22 so that the inner pipe 22 will be moved.

Figure 22:
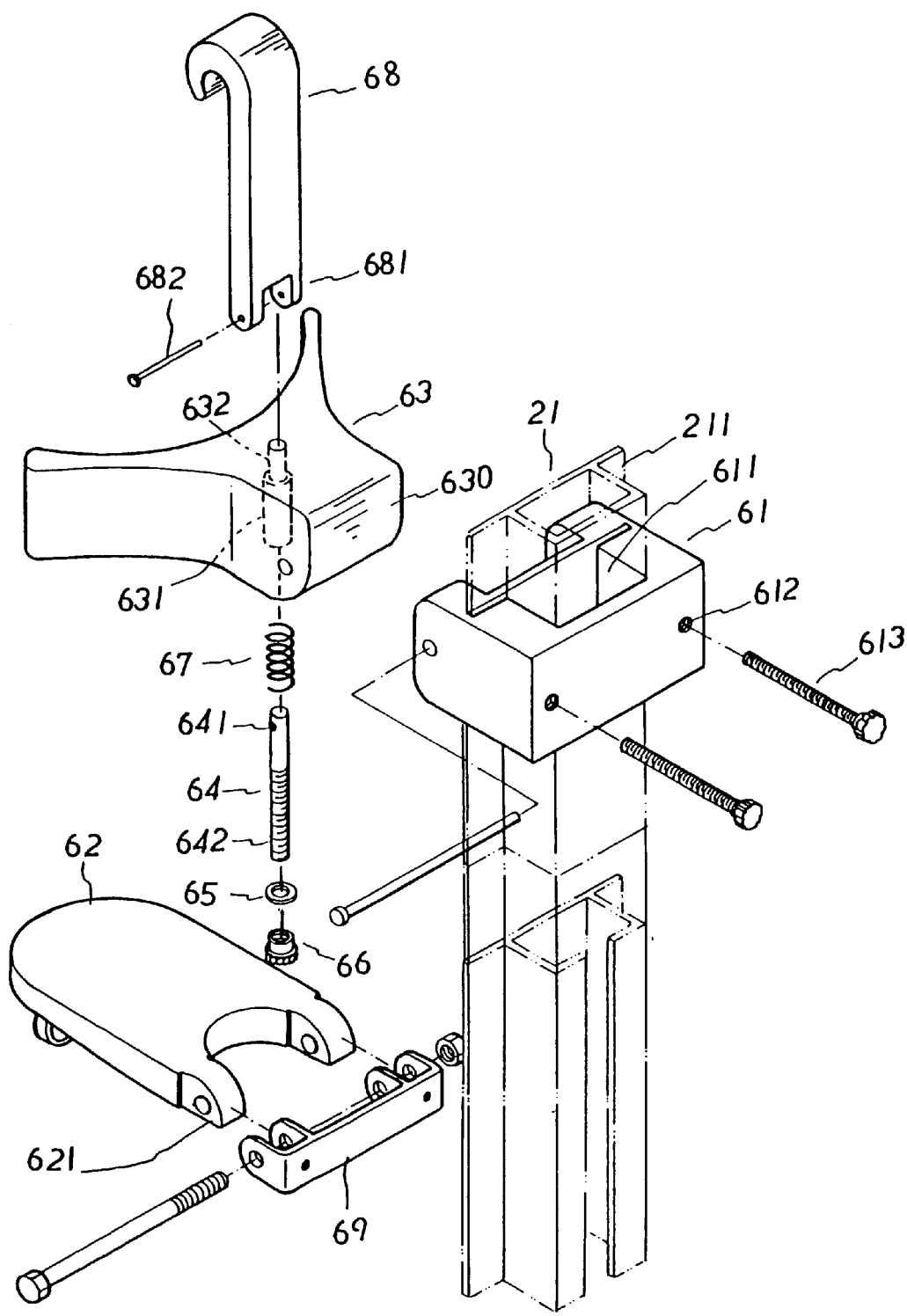
FIG. 22 is a perspective exploded view of an upper bracket and a lower bracket of another preferred embodiment in accordance with the present invention.
Figure 23:
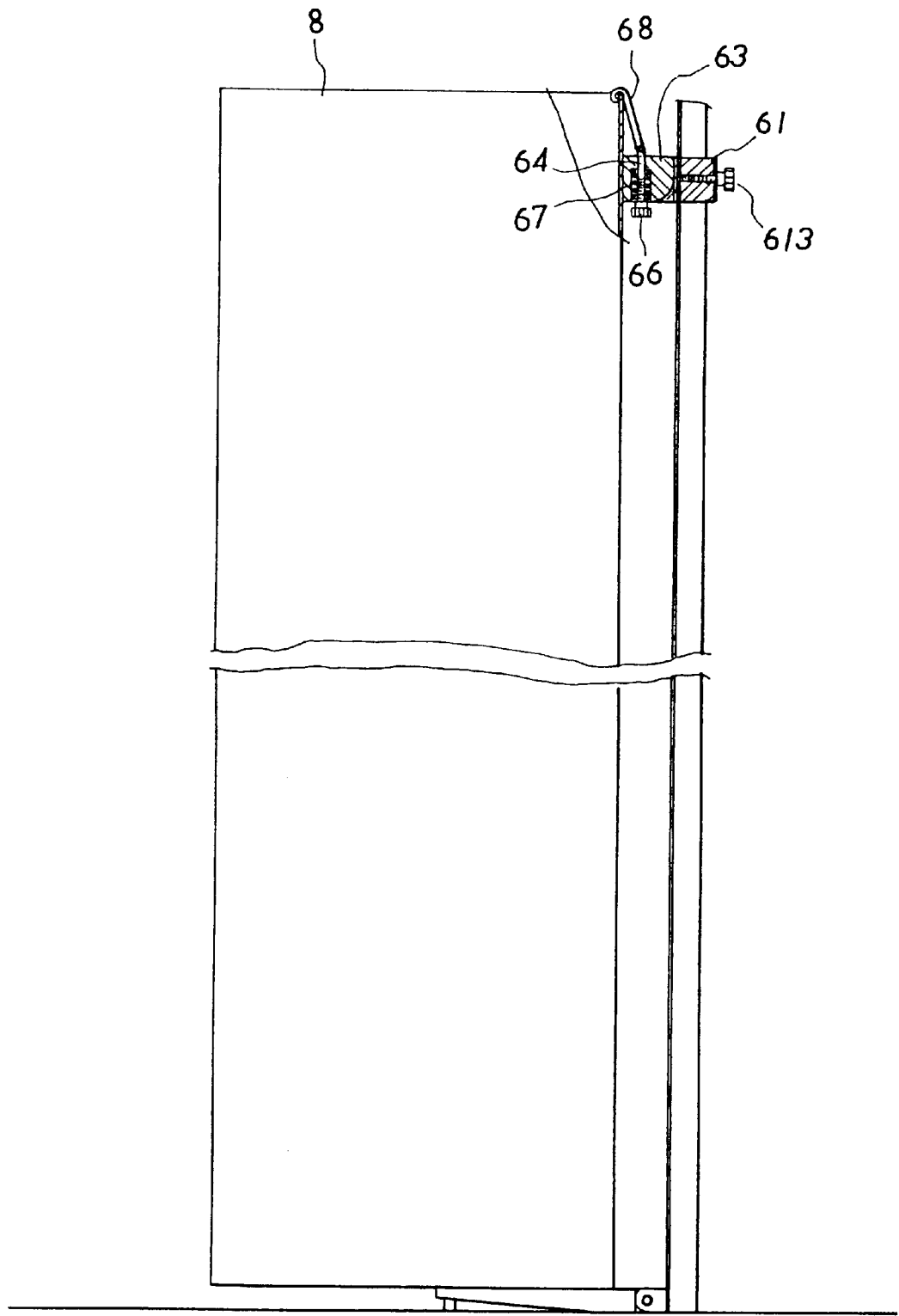
FIG. 23 is a sectional schematic view illustrating an application of an upper bracket of another preferred embodiment in accordance with the present invention.
Figure 24:
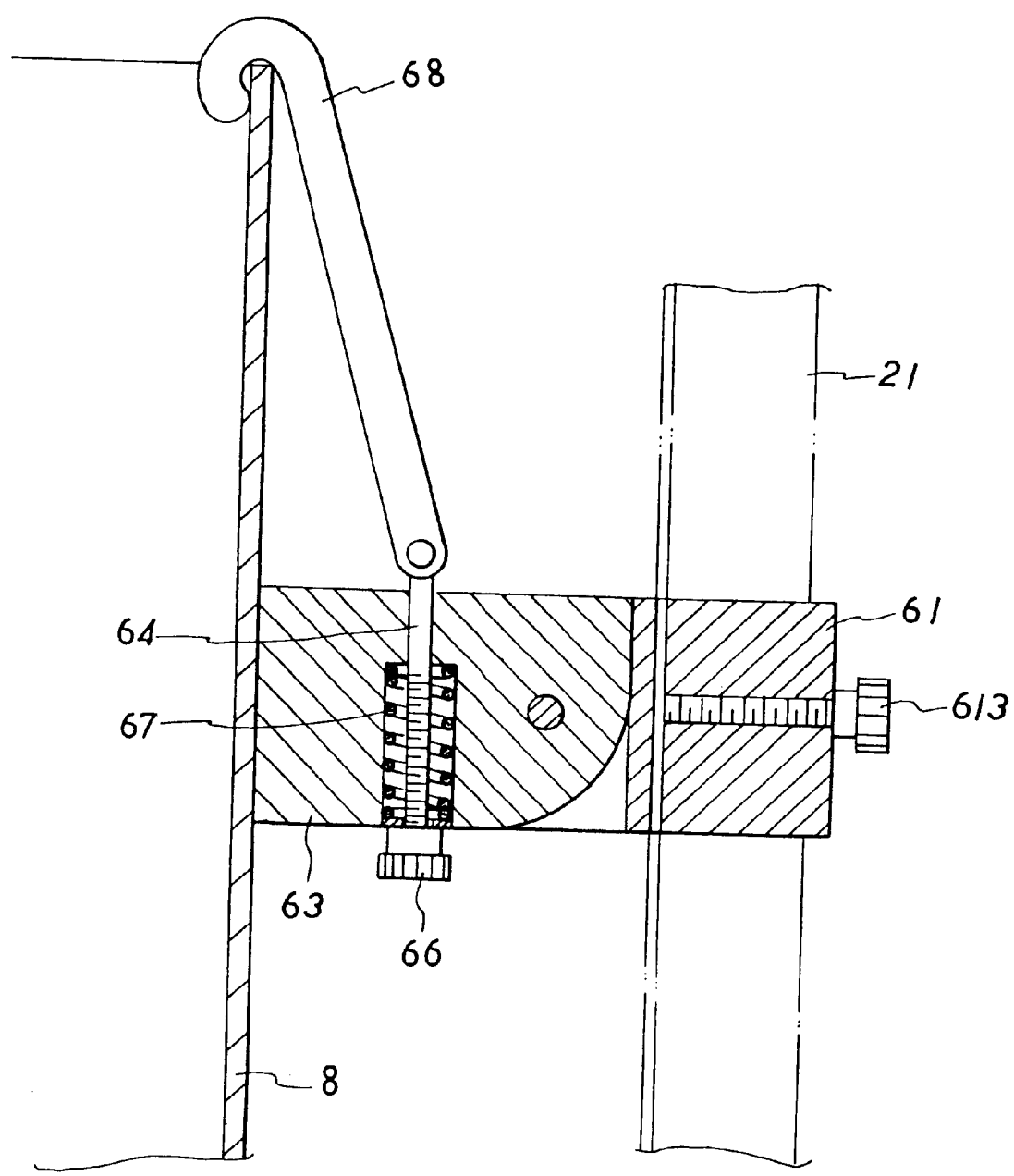
FIG. 24 is a sectional schematic view illustrating an operation of an upper bracket of another preferred embodiment in accordance with the present invention.

Referring to FIGS. 22 to 24, a retainer seat 69 is fastened on a lower portion of the outer pipe 21. A lower bracket 62 has two lug portions 621 fastened on the retainer seat 69.

A U-shaped slide seat 61 is disposed on an upper portion of the outer pipe 21. The U-shaped slide seat 61 has a hollow interior 611 receiving the outer pipe 21 and two threaded holes 612. Two screws 613 fasten the U-shaped slide seat 61 and the outer pipe 21 together.

An upper bracket 63 has a pivot portion 630 fastened on the U-shaped slide seat 61, a circular aperture 631, and a bore 632 communicating with the circular aperture 631.

A pressure spring 67 is inserted in the circular aperture 631 of the upper bracket 63.

A screw rod 64 has a pivot aperture 641 and a threaded portion 642 inserted through the circular aperture 631 of the upper bracket 63 and the bore 632 of the upper bracket 63. A washer 65 receives a lower portion of the screw rod 64. A nut 66 engages with a bottom end of the screw rod 64.

A hook rod 68 has two lug ends 681. A pin 682 fastens the lug ends 681 and the screw rod 64 together via the pivot aperture 641 of the screw rod 64. The hook rod 68 hooks a top portion of the bag 8.

The invention is not limited to the above embodiment but various modification thereof may be made. Further, various changes in form and detail may be made without departing from the scope of the invention.

I claim:

1. A collapsible frame device comprises:
   an outer pipe, an inner pipe inserted in the outer pipe, a lower joint disposed on a middle portion of the outer pipe, two support frames connected to the lower joint, each of the support frames connected to a wheel connector, the wheel connector connected to a wheel, and two pull rods,
   a rope connected to the support frames,
   a handle disposed on a top end of the inner pipe, a releasing device disposed on the outer pipe, the outer pipe having a lateral plate and two L-shaped plates, the L-shaped plates located at a lower portion of the outer pipe, a spacing formed between the L-shaped plates, a slide block disposed on the outer pipe to be slide along the spacing, the slide block having two guide grooves engaging with the L-shaped plates, a recess hole formed on a top portion of the slide block, two pivot couplers disposed on the slide block, each of the pivot couplers having a notch receiving an end of the respective pull rod, each of the pull rods connected to the respective pivot coupler and the respective support frame, a plug block inserted in a lower end of the inner pipe, the plug block having a through hole, a driven rod having a first bent end inserted in the recess hole of the slide block and a second bent end inserted through the through hole of the plug block, the inner pipe having an oblong hole and a positioning aperture, a positioning block disposed in the inner pipe, the positioning block having a main seat, a positioning pin device, a first coiled spring, a blocking pin device, a second coiled spring, an upper cover, and a rectangular plate, the main seat having a transverse opening, a transverse hole communicating with the transverse opening, a longitudinal opening, and a longitudinal hole communicating with the longitudinal opening and the transverse opening, the first coiled spring surrounding a portion of the positioning pin device, the positioning pin device having a shank inserted in the transverse hole and an annular flange inserted in the transverse opening, the second coiled spring surrounding a portion of the blocking pin device, the blocking pin device having a blocking rod inserted in the longitudinal hole and a solid cylinder inserted in the longitudinal opening, the solid cylinder having two round apertures, the upper cover covering a top portion of the main seat, the rectangular plate disposed on the main seat, the rectangular plate facing the oblong hole of the inner pipe, the outer pipe further having a blocking bar, two retainer grooves, and a positioning hole, a hollow casing disposed in a top end of the outer pipe to receive the inner pipe, the hollow casing having two elastic bars, each of the elastic bars inserted in the respective retainer groove, the releasing device having a main mount, the main mount having a hollow interior, and a button disposed in the hollow interior of the main mount, the button having a pressing head protruding outward the main mount, a hollow cylinder, and a center post inserted in a third coiled spring, the center post matching the positioning hole of the outer pipe, when the shank of the positioning pin device enters the positioning hole of the outer pipe, the inner pipe will not be moved, and the blocking rod contacts the annular flange of the positioning pin device, when the pressing head is pressed inward, the center post forces the shank of the positioning pin device disengages from the positioning hole, and the blocking rod blocks the annular flange of the positioning pin device so that the inner pipe will be pulled out of the outer pipe.

2. The collapsible frame device as claimed in claim 1, wherein a lower fixed plate is fastened on a bottom end of the outer pipe, and a lower seat has a slot receiving a lower portion of the lower fixed plate.

3. The collapsible frame device as claimed in claim 1, wherein an upper fixed plate is fastened on an upper end of the outer pipe, and an upper seat has a recess groove receiving an upper portion of the upper fixed plate.

4. A collapsible frame device comprises:

an outer pipe, an inner pipe inserted in the outer pipe, a lower joint disposed on a middle portion of the outer pipe, two support frames connected to the lower joint, each of the support frames connected to a wheel connector, the wheel connector connected to a wheel, and two pull rods, a rope connected to the support frames, a handle disposed on a top end of the inner pipe, a releasing device disposed on the outer pipe, the outer pipe having a lateral plate and two L-shaped plates, the L-shaped plates located at a lower portion of the outer pipe, a spacing formed between the L-shaped plates, a slide block disposed on the outer pipe to be slide along the spacing, the slide block having two guide grooves engaging with the L-shaped plates, a recess hole formed on a top portion of the slide block, two pivot couplers disposed on the slide block, each of the pivot couplers having a notch receiving an end of the respective pull rod, each of the pull rods connected to the respective pivot coupler and the respective support frame, a plug block inserted in a lower end of the inner pipe, the plug block having a through hole, a driven rod having a first bent end inserted in the recess hole of the slide block and a second bent end inserted through the through hole of the plug block, the inner pipe having an oblong hole and a positioning aperture, a positioning block disposed in the inner pipe, the positioning block having a main seat, a positioning pin device, a first coiled spring, a blocking pin device, a second coiled spring, an upper cover, and a rectangular plate, the main seat having a transverse opening, a transverse hole communicating with the transverse opening, a longitudinal opening, and a longitudinal hole communicating with the longitudinal opening and the transverse opening, the first coiled spring surrounding a portion of the positioning pin device, the positioning pin device having a shank inserted in the transverse hole and an annular flange inserted in the transverse opening, the second coiled spring surrounding a portion of the blocking pin device, the blocking pin device having a blocking rod inserted in the longitudinal hole and a solid cylinder inserted in the longitudinal opening, the solid cylinder having two round apertures, the upper cover covering a top portion of the main seat, the rectangular plate disposed on the main seat, the rectangular plate facing the oblong hole of the inner pipe, the outer pipe further having a blocking bar, two retainer grooves, and a positioning hole, a hollow casing disposed in a top end of the outer pipe to receive the inner pipe, the hollow casing having two elastic bars, each of the elastic bars inserted in the respective retainer groove, the releasing device having a main mount, an inner block disposed in the main mount, a compression spring disposed between the main mount and the inner block, and a control rod inserted through the main mount, the inner block having a bevel and a center post, the control rod having a bevel end engaging with the bevel of the inner block, when the control rod moves upward, the center post enters the positioning hole of the outer pipe and the positioning aperture of the inner pipe so that the inner pipe will not be moved, when the control rod moves downward, the center post disengages from the positioning hole of the outer pipe and the positioning aperture of the inner pipe so that the inner pipe will be moved.

5. The collapsible frame device as claimed in claim 4, wherein a retainer seat is fastened on a lower portion of the outer pipe, and a lower bracket has two lug portions fastened on the retainer seat.

6. The collapsible frame device as claimed in claim 4, wherein a U-shaped slide seat is disposed on an upper portion of the outer pipe, the U-shaped slide seat has a hollow interior receiving the outer pipe and two threaded holes, two screws fasten the U-shaped slide seat and the outer pipe together, an upper bracket has a pivot portion fastened on the U-shaped slide seat, a circular aperture, and a bore communicating with the circular aperture, a pressure spring is inserted in the circular aperture of the upper bracket, a screw rod has a pivot aperture and a threaded portion inserted through the circular aperture of the upper bracket and the bore of the upper bracket, a washer receives a lower portion of the screw rod, a nut engages with a bottom end of the screw rod, a hook rod has two lug ends, and a pin fastens the lug ends and the screw rod together via the pivot aperture of the screw rod.

* * * * *